United States Patent [19]

Strepek

[11] Patent Number: 4,725,928
[45] Date of Patent: Feb. 16, 1988

[54] SELF-CONTAINED LIGHTING ASSEMBLY FOR VEHICLE WHEEL

[76] Inventor: John E. Strepek, 16 N. 287 Randall Rd., Elgin, Ill. 60123

[21] Appl. No.: 46,550
[22] Filed: May 6, 1987
[51] Int. Cl.⁴ .............................................. B60Q 1/00
[52] U.S. Cl. ...................................... 362/78; 362/192
[58] Field of Search .......................... 362/78, 192, 193

[56] References Cited
U.S. PATENT DOCUMENTS 2,083,514  6/1937  Brown ................................... 362/78
3,099,401  7/1963  Bell ....................................... 362/78
3,113,727  12/1963  Bradway ............................... 362/78
4,381,537  4/1983  Hinrichs ................................ 362/78

FOREIGN PATENT DOCUMENTS

WO86/04308  7/1986  PCT Int'l Appl. .................... 362/78

Primary Examiner—George L. Walton
Attorney, Agent, or Firm—Mathew R. P. Perrone, Jr.

[57] ABSTRACT

A self-contained lighting assembly capable of being secured to the wheel of a heavy duty truck is formed by having a housing with lights mounted on the housing and a generator mounted within the housing for providing power to the lights from the truck is in motion.

20 Claims, 7 Drawing Figures

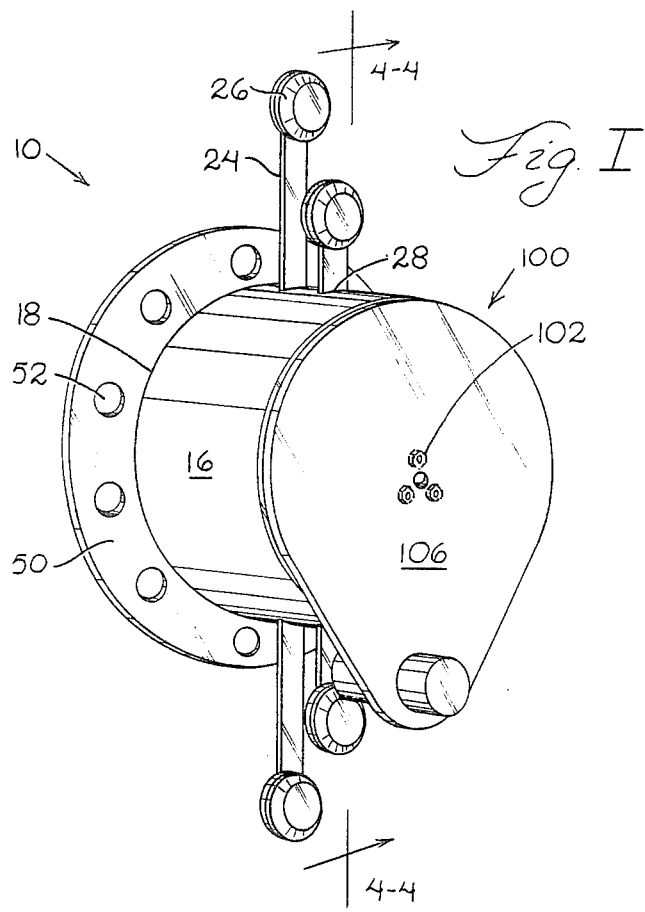
Fig. I
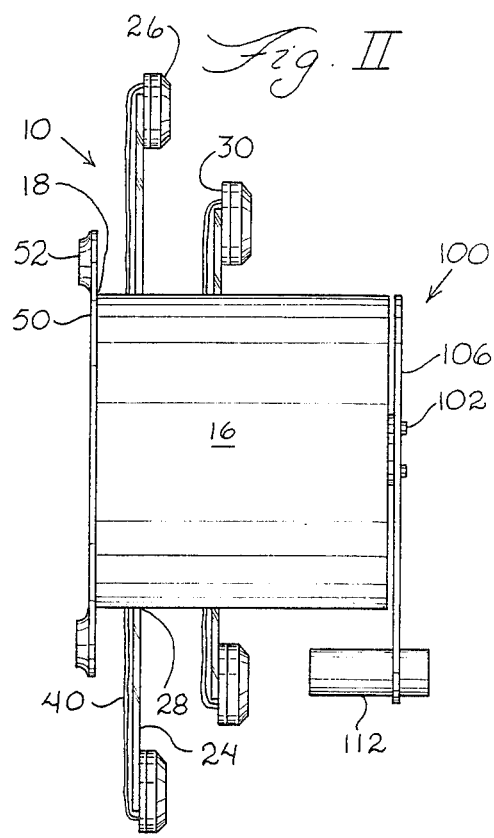
Fig. II
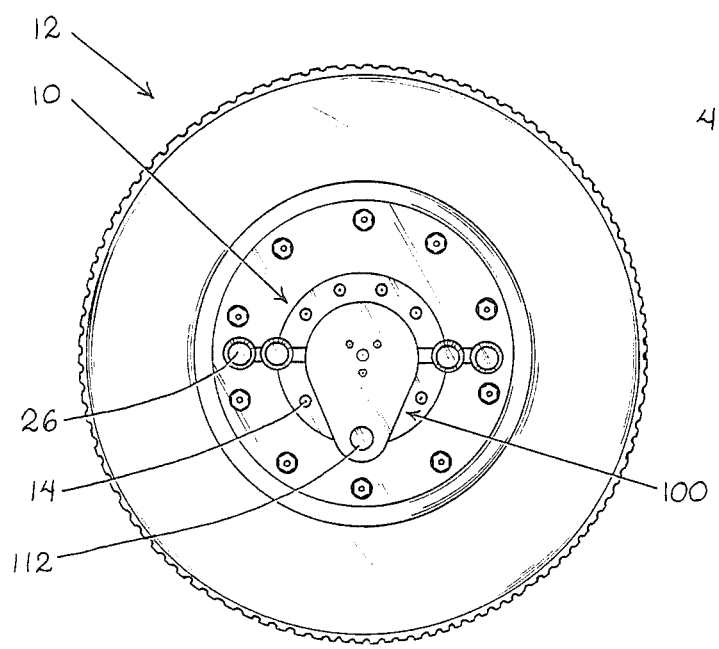
Fig. III

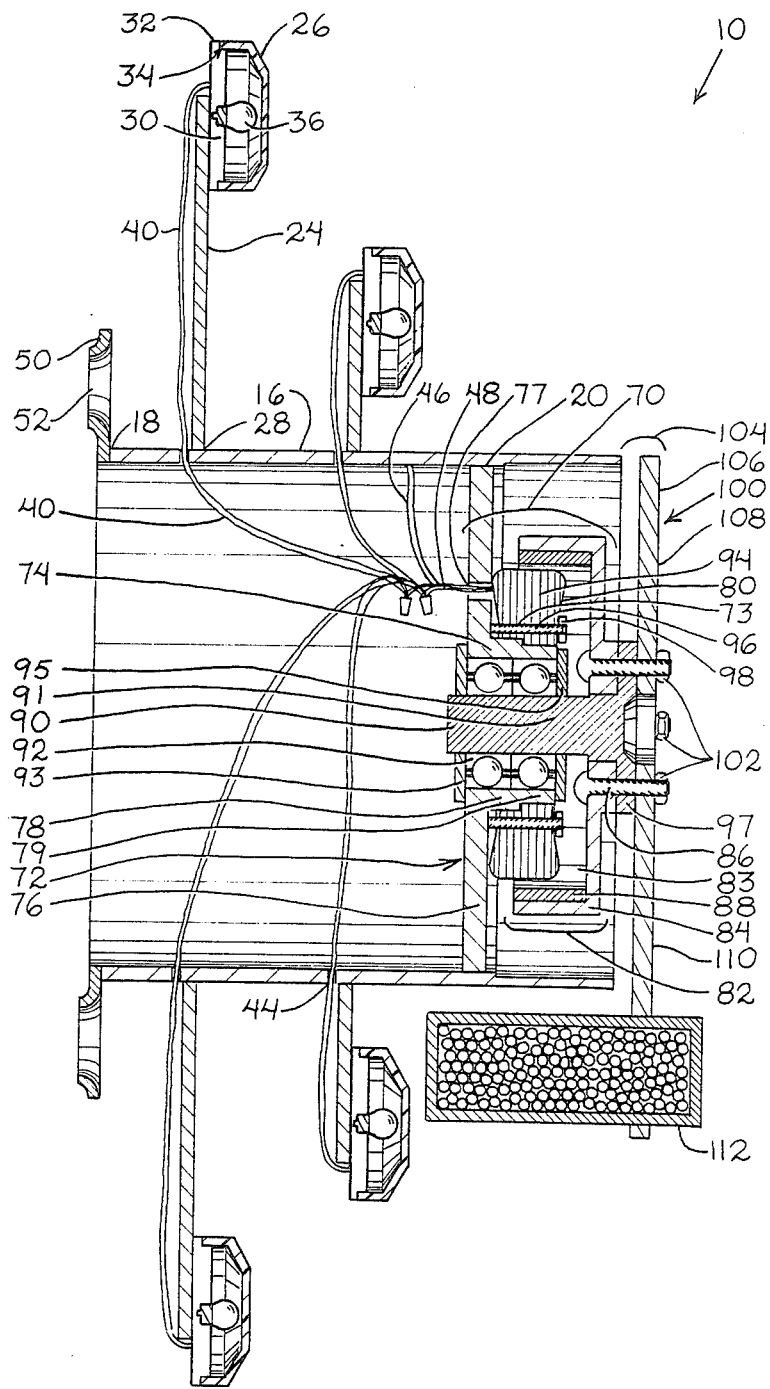
Fig. IV

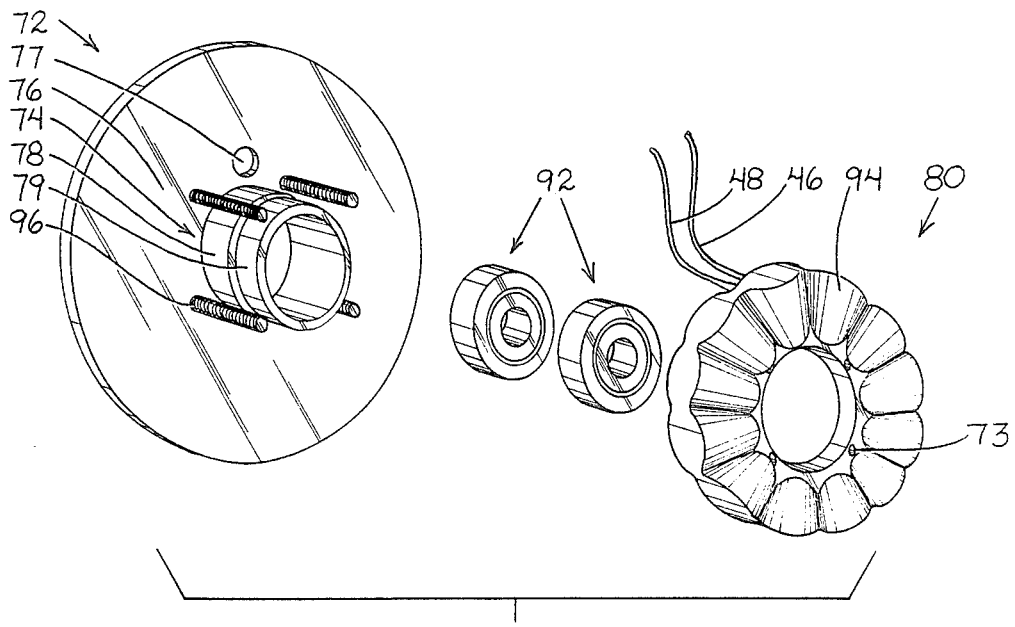
Fig. V
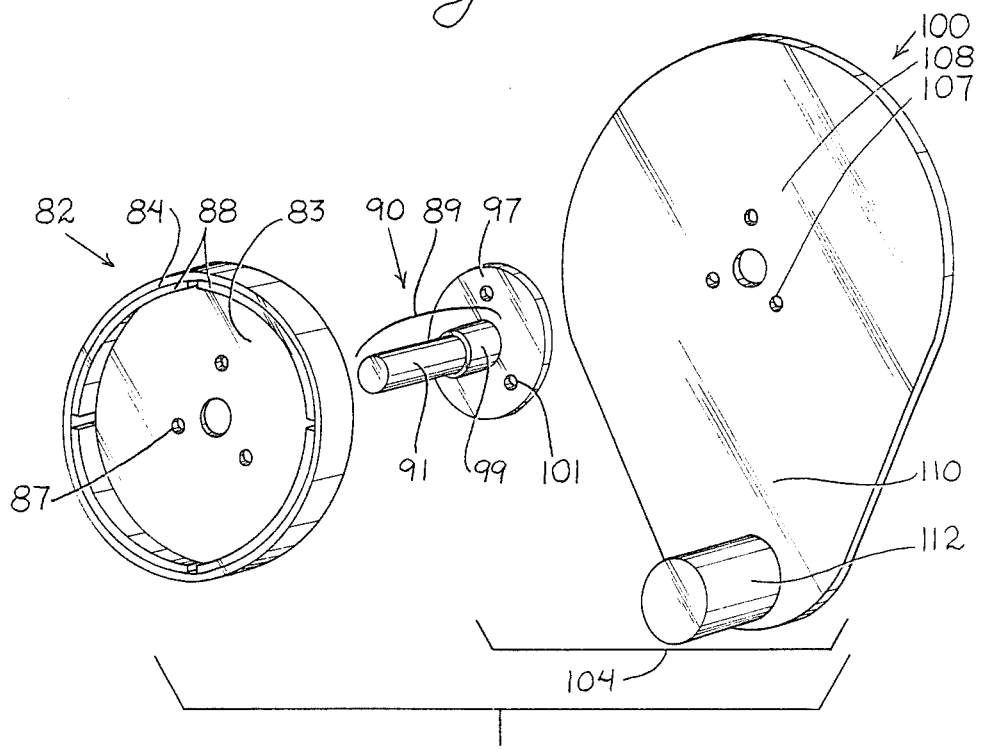
Fig. VI

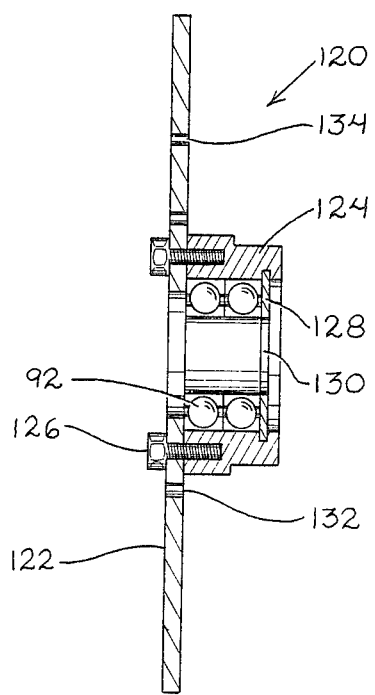
Fig. VII

SELF-CONTAINED LIGHTING ASSEMBLY FOR VEHICLE WHEEL

BACKGROUND OF THE INVENTION

This invention relates to a lighting assembly and more particularly a self-contained light assembly for use on vehicle wheels.

It is the very essence of human nature to desire a decoration that is exclusive to a particular person. This desire is replete throughout history. The caveman has his jewelery. People continue to decorate themselves with jewelery and other ornaments today.

Even with the domestication of animals to assist the human race in the functions of life, people continue the decorative scheme and apply it to their animals. Such decorations can even be combined with safety. Colorful and distinctly decorated armor, used by knights for their war horses, clearly serves both a safety and a decorative function.

With the advent of the automobile and other vehicles to replace the animal, this desire for decoration passes to the vehicle. Typical vehicle decorations are disclosed in U.S. Pat. No. 3,340,389 to Paul S. Senseman, and in U.S. Pat. No. 3,548,185 to Wilbert Hall, these patents being incorporated herein by reference.

In particular, heavy duty trucks desire unique decorations for the purpose of distinguishing the truck and identifying its owner. Wheel decorations and lights can to the aesthetic appearance and safety of a heavy duty truck. If these decorations can add to safety, more desirable results, than the purely aesthetic appearance improvement, are achieved. No adequate device exists for applying lights to the wheels of a heavy duty truck.

Lights on the side of the vehicle help identify the position of the vehicle relative to other vehicles. With this part of the vehicle illuminated, avoidance of the vehicle becomes more simple. Lights make a vehicle more visible. A visible vehicle is more easily avoided. If an opposing vehicle can be avoided, accidents can be avoided, and the desired results of avoiding the accident and resultant damage are obtained.

It is difficult to provide such side lighting on vehicles. The location of the side lighting is especially desired on the wheels for decorative and other suitable purposes. The vibrations caused by the bouncing of the wheels are not conducive to long bulb life and continued functioning of the light.

It is also difficult to make these lighting kits easy to install without a substantial amount of rewiring and reworking of the vehicle. Difficulty of installation minimizes the chance of attempting the installation, and thus precludes the safety and decorative advantages.

If a lighting device could be applied to the side of the vehicle and especially to heavy truck to achieve and improve the aesthetic appearance while at the same time promoting safety with a durability of the light installation, great advantages can be obtained.

SUMMARY OF THE INVENTION

Accordingly among the objects of the present invention is to provide the workable and operable, self-contained light assembly for a wheel.

A further object of this invention is to provide a durable light assembly for a wheel.

A still further object of this invention is to provide a decorative light assembly for a wheel.

Yet a further object of this invention is to provide a safety light assembly for a wheel.

Also an object of this invention is to provide a position-indicating light assembly for a wheel.

Another object of this invention is to provide a light assembly for a wheel, wherein the bulb contained therein has a long life.

Yet another object of this invention is to provide a light assembly for a wheel, which is easy to install on a heavy-duty truck.

These and other objects of the invention are met by providing a self-contained lighting assembly, capable of being secured to the wheel of a heavy duty truck is formed by having a housing with lights mounted on the housing and a generator mounted within the housing for providing power to the lights while the truck is in action.

BRIEF DESCRIPTION OF THE DRAWINGS

FIG. I is perspective view of the front of the lighting assembly 10 of this invention.

FIG. II is a plan, side view of FIG. I.

FIG. III is a plan, front view of FIG. II, showing lighting assembly 10 secured to a truck tire and rim 12.

FIG. IV is a cross-sectional view of FIG. I along line 4—4.

FIG. V is a partial-exploded, front view of FIG. I.

FIG. VI is a partial-exploded, rear view of FIG. I.

FIG. VII is a cross-sectional view of two-piece stator support 120.

Throughout the Figures of drawings where the same part appears in more than one Figure of the drawings, the same numeral is applied thereto.

DESCRIPTION OF THE PREFERRED EMBODIMENTS

A lighting assembly being self-contained and capable of being secured to the wheel of a heavy duty truck is formed by having a housing with lights mounted on the housing and a generator mounted within the housing for providing power to the lights while the truck is in motion.

Referring now to FIG. I, a perspective view of lighting assembly 10 is depicted. Lighting assembly 10 includes housing 16 with lighting brackets 24 welded or otherwise secured thereto. At housing base 18, mounting ring 50 is welded or otherwise secured. Mounting ring 50 includes a plurality of bolt apertures 52 for securing lighting assembly 10 to a tire and rim 12 (shown in FIG. III).

Lighting brackets 24 are flattened bars for holding light bulbs on housing 16. Lighting brackets 24 have a securing end 28 welded or otherwise secured to housing 16. Lighting bracket 24 has a light covers 26 mounted on the end thereof oppositely disposed from the securing end 28. In this FIG. I, four light brackets 24 are shown. The number of lighting brackets 24 may be adjusted to choice.

Oppositely disposed from housing base 18 is counter weight assembly 100. Counter weight assembly 100 serves to stabilize the tire and rim 12 with the lighting assembly 10 in position. Counter weight assembly 100 assists in the functioning of lighting assembly 10, while balancing the magnet assembly 82 (shown in Figure IV) so that magnet assembly 82 does not rotate when the truck (not shown) is in motion. Counter weight assembly 100 is accured in a position adjacent to housing 16 by magnet bolts 85, in a fashion that will become more clear upon consideration of subsequent Figures. Counter weight assembly 100 provides for a linear motion only for itself and magnet 82, while housing 16 and other parts of lighting assembly 10 have both linear and rotary motion as tire and rim 12 roll along the highway.

Referring now to FIG. II, a side view of lighting assembly 10 is depicted. Mounting bolt apertures 52 are shown as concaved and designed to receive the lug nuts 14 (shown in FIG. III) for holding the tire and rim 12 (also shown in FIG. III) on a truck (not shown). In this fashion, the lug nuts 14 can lock and hold the housing 16 and the tire and rim 12 in place.

It is clear that a heavy duty live wire 40 runs from light mounting socket 30 to the interior of housing 16 through wire apertures 44 (shown also in FIG. IV). Each light mounting socket 30 is self-grounding. From the side view counter weight assembly 100 can be seen as having a counter plate 106 with a weight cylinder 112 secured at a bottom portion thereof. In this fashion, the lighting assembly 10 can be balanced accordingly.

In FIG. III, a front view of lighting assembly 10 is shown as secured to tire and rim 12. Tire and rim 12 in intended to depict a tire and rim on a heavy-duty, over the road truck (not shown). Lighting assembly 10 is accured to the tire and rim 12 by using the lug nuts 14 of the tire and rim 12 or similar bolt pattern already in place on the tire and rim 12. In this fashion, mounting of lighting assembly 10 is greatly simplified. Four light covers 26 are depicted showing the mounting of the light covers 26 such that they are parallel and diametrically opposed pairs. Of course, other suitable arrangements are permitted so long as the housing 16 is balanced.

Referring now to FIG. IV, a cross-sectional view of FIG. 1 along Line 4—4 is depicted. In this fashion, the structure of the lighting assembly is more clearly shown.

Lighting assembly 10 includes a housing 16 and a mounting ring 50 secured to housing 16 at housing base 18, with a generator 70 in turn secured in the generator mount 20 and balanced by a counter weight assembly 100. Housing 16 is generally a cylindrical tube (preferably made of aluminum). Housing 16 has a housing base 18 at one end thereof, and generator mount 20 machined or otherwise formed in housing 16 and oppositely disposed from housing base 18.

Adjacent housing base 18 is secured at least one lighting bracket 24 (four of lighting brackets 24 being shown in this Figure). Lighting bracket 24 includes a light cover 26 mounted opposite to securing end 28 of lighting bracket 24. Securing end 28 of lighting bracket 24 is generally welded or otherwise secured to housing 16. Light cover 26 is secured to light mounting end 32. Light mounting end 32 further includes a light aperture 34 adapted to receive a light mounting socket 30.

Light mounting socket 30 receives a bulb 36 and is adapted to receive light cover 26 to protect bulb 36. Light mounting socket 30 is a standard, self-grounding item secured in a standard fashion to light aperture 34, snap-on, screw-on, glue-on or similar structure. Light cover 26 may be of any color and is snap connected or otherwise secured to light mounting socket 30 in a standard fashion. From each light mounting socket 30 protrudes light live wire 40. Light live wire 40 runs through housing wire apertures 44 to form an electrical interconnection between generator 70 and light mounting socket 30 so bulb 36 may function.

This electrical interconnection is formed by an electrical connection between light live wire 40 and stator live wire 48. Light live wire 40 runs from from light mounting socket 34 to stator live wire 48. Stator live wire 48 runs from stator 80 to light live wire 40. Stator ground wire 46 is secured to housing 16 to form the ground for stator 80. Stator ground wire 46 runs from stator 80 and is secured to any suitable place in housing 16. The preferred point is on the interior of housing 16. In this fashion, power may be provided to bulb 36 when generator 70 is in operation.

Housing base 18 has secured thereto, by welding or other suitable means, mounting ring 50. Mounting ring 50 includes a plurality of mounting apertures 52 suitable for securing housing 16, and therefore lighting assembly 10, to tire and rim 12 (shown in FIG. III) of a heavy duty truck (not shown).

Oppositely disposed from housing base 18 is generator mount 20. Generator mount 20 is machined in housing 16 in order to receive generator 70. Included as parts of generator 70 is a stator mount 72. Stator mount 72 slides into generator mount 20 in housing 16 and is secured therein by welding or other suitable means thereto. Centrally located in stator mount 72 is stator support 74. Stator support 74 is a cylindrically shaped, raised central portion designed to receive stator 80.

Stator support 74 is machined as a cylindrical, raised portion to be centrally located in stator plate 76 to form stator mount 72. Large hub portion 78 is machined as an enlarged part of stator support 74, while smaller hub portion 79 has a smaller machined diameter. Together large hub portion 78 and smaller hub portion 79 make up stator support 74, which is designed to receive stator 80. Large hub portion 78 is adjacent to stator plate 76. Smaller hub portion 79 is adjacent to magnet assembly 82.

Stator 80 is bolted to stator plate 76 by stator bolts 96 machined in, welded to, or otherwise secured to stator plate 76, and positioned adjacent to stator hub 78. Stator bolts 96 are received by stator apertures 73 in stator 80, so that stator 80 is mounted on the outside of stator support 74. Stator nuts 98 are in threaded relation with stator bolts 96 to secure stator 80 in place on stator support 74.

Magnet assembly 82 consists of a rotor 84 with magnet 88 within the circular rim of rotor 84. Magnet assembly 82 is held substantially in place while truck is in motion, due to the action of the counter weight assembly 100. The rotation of the stator 80, while the truck is in motion, within the cavity 83 of magnet assembly 82 provides the wire coil cutting the magnetic field of magnet 88 to produce the necessary electricity to power bulb 36. Magnet assembly 82 is cylindrical in shape, and one end of the cylinder is partially closed to form cavity 83.

Magnet assembly 82 is circular in nature, as is stator 80, and is secured in housing 16 at generator mount 20. Stator bearings 92 are roller or ballbearing rings, and slideably mounted within stator support 74. Magnet hub 90 passes through stator bearings 92 and is secured in stator plate 76 by a plate slip ring 93. A bearing slip ring 95 is situated on magnet hub 90 at decreased stator rod portion 91, to thereby hold bearings 92 within stator support 74, so that housing 16 may rotate with tire and rim 12, while magnet assembly 82 and parts secured thereto remain do not rotate with tire and rim 12. Magnet assembly 82 is secured in place by magnet hub 90 in stator support 74. In this fashion, magnet bolts 86 secure magnet assembly 82 to magnet hub 90.

In order to provide stability to the tire and rim 12 and prevent rotation of the magnet assembly 82, a counter weight assembly 100 is secured to magnet hub 90 at magnet bolts 86. The counter weight assembly 100 is mounted in place with the three magnet bolts 86 and corresponding magnet nuts 102 for securing the counter weight assembly 100 to the magnet hub 90. Hub assembly 104 is formed with hub plate 97 and the counter weight assembly 100.

Counter weight assembly 100 has a counter plate 106 with generally circular portion 108 with magnet bolts 86 situated about the central portion thereof. Magnet bolts 86 secure counter weight assembly 100 to magnet assembly 82. Magnet bolts 86 pass through magnet assembly 82 into hub plate 97 of magnet hub 90, and then into and through circular portion 108 where magnet nuts 103 are secured in threaded relation magnet bolts 86.

Magnet assembly 82 is between stator 80 and counter weight assembly 100. Triangular portion 110 of counter weight assembly 100 has a weight cylinder 112 secured to the vertex thereof. An easily determined amount of weight is secured in the weight cylinder 112 in a standard fashion.

Referring now to FIG. V, an exploded, perspective view of parts of generator 70 are depicted. Included in the parts of a generator 70 shown in this Figure are stator mount 72 stator bearings 92, and stator 80. These parts in FIG. V rotate and have linear motion in relation with tire and rim 12, whereas the parts in FIG. VI remain stationary, in that only the linear motion is achieved in relation with tire and rim 12 and not the rotary motion.

Stator mount 72 includes stator support 74 centrally located in stator plate 76. Stator mount 72 is secured in generator mount 20 by welding of stator plate 76 to housing 16 at generator mount 20. The centrally-located, cylindrical stator support 74 is designed to receive stator 80. Stator support 74 has large hub portion 78 adjacent stator plate 76 and a smaller hub portion 79 adjacent magnet 82.

Stator ground wire 46 connects to housing 16. Stator live wire 48 connects to light live wire 40. These connections complete the circuit for lighting assembly 10. Stator ground wire 46 and stator live wire 48 pass through stator aperture plate 77 in stator mount 72. Then light live wire 40 and stator live wire 48 may be connected to light mounting socket 30 (shown in FIG. IV). When generator 70 is activated as the truck (not shown) is driven with tire and rim 12 rotating, power goes to light mounting socket 30 and bulb 36 lights.

Referring now to FIG. VI, an exploded, perspective view of additional parts of generator 70 are depicted. Included in the parts of a generator 70 shown in this Figure are magnet hub 90. These parts in FIG. VI remain stationary in relation with tire and rim 12, whereas the parts in FIG. V rotate with tire and rim 12.

As stator 80 rotates with the spinning of the tire and rim 12, the wire coil 94 of stator 80 cuts the magnetic field of magnets 88 and creates an electric current powering the bulb 36. Magnet hub 90 permits stator plate 76 to hold stator 80 and magnet assembly 82 in place. In this fashion, magnet assembly 82 is secured in place by magnet hub 90 adjacent stator support 74.

Magnet hub 90 has a hub plate 97 with a magnet bar 89 protruding therefrom. Magnet bar 89 is cylindrical in nature and has an enlarged portion 99 adjacent hub plate 99 which is secured in the center of magnet assembly 82 by means of magnet bolts 86 passing through magnet apertures 87 and hub plate apertures 101. Enlarged portion 99 decreases in diameter to form stator rod portion 91. Stator bearings 92 are capable of rotating about stator rod portion 91.

Stator rod portion 91 passes through stator bearings 92. Stator rod portion 91 is secured in stator mount 72 by the plate slip ring 93 in standard fashion. Other securing means are suitable, but the plate slip ring 93 is preferred. A bearing slip ring 95 is used to secure stator bearings 92 in stator support 74. Plate slip ring 93 is oppositely disposed from bearing slip ring 95 on opposing sides of bearings 92. Bearing slip ring 95 may also be replaced by another securing device, but it too is preferred.

In order to provide stability to the wheel in spite of the additional housing 16 thereon, a counter weight assembly 190 is secured to hub plate 97. Magnet bolts 36 pass through counter plate apertures 107 and are secured with magnet nuts 102. Hub assembly 104 is formed with hub plate 97 and the counter weight assembly 100.

In FIG. VII is seen a modification of stator support 72. Stator support 72 may be constructed in the form of a two piece stator support 120. This structure simplifies manufacture of lighting assembly 10 and is preferred over stator support 72. Two piece stator support 120 includes stator bore holder 122. Stator bore holder 122 is a rounded circular flattened piece of material having a centrally located aperture for receiving the other parts of the generator 70. Stator bore holder 120 fits into generator mount 20. Stator bore 124 is centrally mounted on stator bore holder 122 by bore bolts 126. More bolts 126 pass through stator bore holder 122 into threaded relation with stator bore 124.

Within stator bore 124, stator bearings 92 may be mounted. Bore washer 128 is secured in stator bore 124 and oppositely disposed from stator bore holder 122. As stator bore 124 is mounted to stator bore holder 122, bearings 92 may be secured therein. Bore washer 128 of course has a washer aperture 130 to receive magnet hub 90 and thereby mount the magnet assembly 82 around the stator 80. Stator bolts 96 pass through stator 80 and into bore holder apertures 132 to mount stator 80. Stator ground wire 46 and stator live wire 48 pass through bore wire apertures 134 to provide for proper connections. In this fashion the two piece stator support 120 may achieve the same results as stator mount 72.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by letters patent by the United States is:

1. A self-contained, lighting assembly, capable of being secured to a tire and rim of a heavy duty truck, said assembly including a housing with at least one light bracket secured to said housing and a generator mounted within said housing for providing power to said at least one light bracket when said heavy-duty truck is in motion, wherein:
  a. said housing includes a base and a generator mount;
  b. said base is oppositely disposed from said generator mount;
  c. a mounting ring is secured to said housing at said base;
  d. said mounting ring includes a plurality of bolt apertures for securing said self-contained lighting assembly to said tire and rim;
  e. said generator is secured in said generator mount;
  f. said at least one light bracket has a securing end secured to said housing adjacent to said housing base;
  g. said at least one light bracket has a light mounting end oppositely disposed from said securing end;
  h. said generator mount is formed in said housing in order to receive said generator;
  i. said generator includes a stator mount, a stator, and a magnet;
  j. said stator mount is secured in said generator mount;
  k. said stator mount includes a stator plate with a stator support centrally located in said stator plate;
  l. said stator support is hollow and receives stator bearings therein;
  m. a magnet hub passes through said stator bearings and is secured to said stator plate;
  n. said magnet is secured to said magnet hub adjacent to said stator and oppositely disposed from said stator plate;
  o. said magnet hub passes through said stator bearings are movably secured in said stator plate by a first magnet hub securing means so that said stator plate may rotate, while said magnet hub is nonrotatable; and
  p. a bearing securing means holds said bearings within said stator hub so that housing may rotate with said tire and rim.

2. The self-contained, lighting assembly of claim 1, wherein:
  a. said light mounting and has a light cover secured thereto:
  b. said light mounting end includes a light aperture adapted to receive a light socket;
  c. said light socket receives a bulb therein;
  d. said light cover covers said bulb;
  e. said light socket is self grounding; and
  f. said light socket receives a bulb therein.

3. The self-contained, lighting assembly of claim 2, wherein:
  a. said light socket has light live wire electrically secured therein and protruding therefrom;
  b. said at least one light bracket is secured to an exterior of said housing;
  c. said housing includes a housing wire aperture in said housing adjacent to said securing end of said at least one light bracket;
  d. said housing wire aperture receives said light live wire on an interior of said housing;
  e. said light cover is snap connected to said light socket; and
  f. said light live wire forms an electrical interconnection between said generator and said socket—so that said bulb may function.

4. The self-contained, lighting assembly of claim 3, wherein
  said housing is a cylindrical tube.

5. The self-contained, lighting assembly of claim 4, wherein:
  a. said stator support is a cylindrically shaped, raised central portion of said stator mount designed to receive said stator;
  b. said stator includes a stator live wire electrically interconnected to said light live wire to complete a circuit between said bulb and said stator;
  c. said stator further includes a stator ground wire connected to said housing to complete said circuit;
  d. said stator support includes a stator hub adjacent said stator plate as an enlarged part of said stator support;
  e. a stator top is adjacent said stator hub;
  f. said stator hub is between said stator top and said stator plate;
  g. said stator top has a smaller diameter than said stator hub;
  h. at least one stator bolt is secured secured to said stator plate adjacent to said stator hub; and
  i. at least one stator aperture receives said at least one stator bolt and is secured thereto by a stator nut.

6. The self-contained, lighting assembly of claim 5, wherein
  a counter weight assembly is secured to said magnet hub and is oppositely disposed from said mounting ring.

7. The self-contained, lighting assembly of claim 6, wherein wherein:
  a. said magnet and said counter weight assembly have a substantially linear motion only while said tire and rim have a linear and rotary motion;
  b. said stator rotates with said tire and rim to thereby provide a wire coil cutting a magnetic field of said magnet to produce the necessary electrical power for said bulb;
  c. said stator bearings are slideably mounted within said stator hub; and
  d. said magnet hub includes a hub plate oppositely disposed from said stator plate.

8. The self-contained, lighting assembly of claim 7, wherein:
  a. a magnet bolt secures said magnet to said magnet hub by being centrally located in said stator hub and in threaded relation therewith;
  b. said counter weight assembly is bolted to said hub plate of said magnet hub and said magnet;
  c. said counter weight assembly includes a counter plate;
  d. said counter plate has a generally circular portion with at least two weight bolts situated about a central portion of said circular portion;
  e. said counter plate has said generally circular portion with a triangular portion and a weight container secured adjacent to a vertex of said triangular portion; and
  f. said weight bolts pass pass through through said magnet into said hub plate of magnet hub, and then into and through said circular portion with at least two weight nuts secured in threaded relation with said weight bolts.

9. The self-contained, lighting assembly of claim 8, wherein:
  a. said magnet is cylindrical in shape with one end partially closed to form said cavity;

b. said stator rotates, while said truck is in motion, within said cavity to provide electricity to said bulb; and c. a magnet bolt secures said magnet to said magnet hub and is centrally located in said stator hub, in threaded relation therewith.

10. The self-contained, lighting assembly of claim 9, wherein:
   a. said mounting bolt aperture is concave and designed to receive a lug nut for holding said tire and rim on said;
   b. said light covers are snap mounted over said bulbs;
   c. said stator hub has a large hub portion adjacent to said stator plate and a smaller hub portion adjacent to said magnet;
   d. said magnet hub has a hub plate with a magnet bar protruding therefrom;
   e. said magnet bar has an enlarged portion adjacent said hub plate;
   f. said hub plate is secured in the center of said magnet;
   g. said enlarged portion decreases in diameter to form stator rod;
   h. said stator rod is surrounded by said bearings;
   i. said stator rod is secured in said stator mount; and
   j. said bearings are secured in said stator hub.

11. The self-contained, lighting assembly of claim 10, wherein:
   a. said housing is a cylindrical tube;
   b. said generator mount is formed in said housing in order to receive said generator;
   c. said generator includes stator mount, a stator, and a magnet;
   d. said stator mount is secured in said generator mount.

12. The self-contained, lighting assembly of claim 11, wherein:
   a. said stator is a two-piece device including a stator bore holder with a stator bore secured thereto;
   b. said stator bore holder is secured in said generator mount;
   c. said stator bore is centrally secured to said stator bore holder;
   d. said stator bore has a bore washer secured therein and oppositely disposed from said stator bore holder;
   e. said bearings are mounted between said bore washer and said stator bore holder; and
   f. said bore washer has a washer aperture centrally located therein to receive said magnet hub and thereby mount said magnet around said stator.

13. The self-contained, lighting assembly of claim 12, wherein:
   a. said light mounting end has a light cover secured thereto;
   b. said light mounting end includes a light aperture adapted to receive a light socket;
   c. said light socket receives a bulb therein;
   d. said light cover covers said bulb;
   e. said light socket is self grounding; and
   f. said light socket receives a bulb therein.

14. The self-contained, lighting assembly of claim 13, wherein:
   a. said light socket has light live wire electrically secured therein and protruding therefrom;
   b. said at least one light bracket is secured to an exterior of said housing;
   c. said housing includes a housing wire aperture in said housing adjacent to said securing end of said at least one light bracket;
   d. said housing wire aperture receives said light live wire on an interior of said housing;
   e. said light cover is snap connected to said light socket; and
   f. said light live wire forms an electrical interconnection between said generator and said socket—so that said bulb may function.

15. The self-contained, lighting assembly of claim 14, wherein:
   a. said magnet and said counter weight assembly have a linear motion only when said tire and rim rotate;
   b. said stator rotains with said tire and rim to thereby provide a wire coil cutting a magnetic field of said magnet to produce the necessary electrical power for said bulb;
   c. said stator bearings are slideably mounted within said stator hub;
   d. said magnet hub passes through said stator bearings is movably secured in said stator plate by a first magnet hub securing means so that said stator plate may rotate, while magnet hub is nonrotatable;
   e. a bearing securing means holds said bearings within said stator hub so that housing may rotate with said tire and rim; and
   f. said magnet hub includes a hub plate oppositely disposed from said stator plate.

16. The self-contained, lighting assembly of claim 15, wherein:
   a. a magnet bolt secures said magnet to said magnet hub by being centrally located in said stator hub and in threaded relation therewith;
   b. said counter weight assembly is bolted to said hub plate of said magnet hub and said magnet;
   c. said counter weight assembly includes a counter plate;
   d. said counter plate has a generally circular portion with at least two weight bolts situated about a central portion of said circular portion;
   e. said counter plate has said generally circular portion with a triangular portion and a weight container secured adjacent to a vertex of said triangular portion; and
   f. said weight bolts pass pass through through said magnet into said hub plate of magnet hub, and then into and through said circular portion with at least two weight nuts secured in threaded relation with said weight bolts.

17. The self-contained, lighting assembly of claim 16, wherein:
   a. said magnet is cylindrical in shape with one end partially closed to form said cavity;
   b. said stator rotates, while said truck is in motion, within said cavity to provide electricity to said bulb; and
   c. a magnet bolt secures said magnet to said magnet hub and is centrally located in said stator hub, in threaded relation therewith.

18. The self-contained, lighting assembly of claim 17, wherein:
   a. said mounting bolt aperture is concave and designed to receive a lug nut for holding said tire and rim on said truck;
   b. said light covers are snap mounted over said bulbs;

c. said stator hub has a large hub portion adjacent to said stator plate and a smaller hub portion adjacent to said magnet;

d. said magnet hub has a hub plate with a magnet bar protruding therefrom;

e. said magnet bar has an enlarged portion adjacent said hub plate;

f. said hub plate is secured in the center of said magnet;

g. said enlarged portion decreases in diameter to form stator rod;

h. said stator rod is surrounded by said bearings;

i. said stator rod is secured in said stator mount; and j. said bearings are secured in said stator hub.

19. A self-contained, lighting assembly, capable of being secured to a tire and rim of a heavy duty truck, said assembly including a housing with at least one light bracket secured to said housing and a generator mounted within said housing for providing power to said at least one light bracket when said heavy-duty truck is in motion, wherein:

a. said housing includes a base and a generator mount;

b. said base is oppositely disposed from said generator mount;

c. a mounting ring is secured to said housing at said base;

d. said mounting ring includes a plurality of bolt apertures for securing said self-contained lighting assembly to said tire and rim;

e. said generator is secured in said generator mount;

f. said at least one light bracket has a securing end secured to said housing adjacent to said housing base;

g. said at least one light bracket has a light mounting end oppositely disposed from said securing end;

h. said housing is a cylindrical tube;

i. said generator mount is formed in said housing in order to receive said generator;

j. said generator includes a stator mount, a stator, and a magnet;

k. said stator mount is secured in said generator mount;

l. said stator is a two-piece device including a stator bore holder with a stator bore secured thereto;

m. said stator bore holder is secured in said generator mount;

n. said stator bore is centrally secured to said stator bore holder;

o. said stator bore has a bore washer secured thereto and oppositely disposed from said stator bore holder;

p. stator bearings are mounted between said bore washer and said stator bore holder within said stator bore;

q. said bore washer has a washer aperture centrally located therein to receive said magnet hub and thereby mount said magnet around said stator;

r. said light mounting end has a light cover secured thereto;

s. said light mounting end includes a light aperture adapted to receive a light socket;

t. said light socket receives a bulb therein;

u. said light cover covers said bulb;

v. said light socket is self grounding;

w. said light socket receives a bulb therein;

x. said stator bearings are slideably mounted within said stator bore;

y. said magnet hub passes through said stator bearings is movably secured in said stator plate by a first magnet hub securing means so that said stator plate may rotate, while magnet hub is nonrotatable; and z. a bearing securing means holds said bearings within said stator bore so that said housing may rotate with said tire and rim.

20. The self-contained, lighting assembly of claim 19, wherein:

a. said light socket has a light live wire electrically secured therein and protruding therefrom;

b. said at least one light bracket is secured to an exterior of said housing;

c. said housing includes a housing wire aperture in said housing adjacent to said securing end of said at least one light bracket;

d. said housing wire aperture receives said light live wire on an interior of said housing;

e. said light cover is snap connected to said light socket;

f. said light live wire forms an electrical interconnection between said generator and said socket —so that said bulb may function;

g. said magnet and said counter weight assembly have a linear motion only when said tire and rim rotate;

h. said stator rotates with said tire and rim to thereby provide a wire coil cutting a magnetic field of said magnet to produce the necessary electrical power for said bulb;

i. said magnet hub includes a hub plate oppositely disposed from said stator plate;

j. a magnet bolt secures said magnet to said magnet hub by being centrally located in said stator bore and in threaded relation therewith;

k. said counter weight assembly is bolted to said hub plate of said magnet hub and said magnet;

l. said counter weight assembly includes a counter plate;

m. said counter plate has a generally circular portion with at least two weight bolts situated about a central portion of said circular portion;

n. said counter plate has said generally circular portion with a triangular portion and a weight container secured adjacent to a vertex of said triangular portion;

o. said weight bolts pass pass through through said magnet into said hub plate of magnet hub, and then into and through said circular portion with at least two weight nuts secured in threaded relation with said weight bolts;

p. said magnet is cylindrical in shape with one end partially closed to form said cavity;

q. said stator rotates, while said truck is in motion, within said cavity to provide electricity to said bulb;

r. a magnet bolt secures said magnet to said magnet hub and is centrally located in said stator bore, in threaded relation therewith;

s. said stator bore has a large hub portion adjacent to said stator plate and a smaller hub portion adjacent to said magnet;

t. said magnet hub has a hub plate with a magnet bar protruding therefrom;

u. said magnet bar has an enlarged portion adjacent said hub plate;

v. said hub plate is secured in the center of said magnet; and w. said enlarged portion decreases in diameter to form said stator rod.

* * * * *